(12) United States Patent
Manakkal

(10) Patent No.: US 6,980,923 B1
(45) Date of Patent: Dec. 27, 2005

(54) METHOD TO PREVENT ODOMETER FRAUD

(75) Inventor: Raj Manakkal, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 39 days.

(21) Appl. No.: 10/608,823

(22) Filed: Jun. 27, 2003

(51) Int. Cl.$^7$ .................................................. G01B 7/02
(52) U.S. Cl. ...................................................... 702/165
(58) Field of Search .............................. 702/165, 158, 702/29; 701/29, 115, 93, 815; 714/25; 324/110; 307/10, 10.1, 101; 340/438; 29/840

(56) References Cited

U.S. PATENT DOCUMENTS

| | | |
|---|---|---|
| 3,614,617 A | 10/1971 | Blake |
| 4,642,787 A * | 2/1987 | McCarthy et al. .......... 702/165 |
| 4,887,704 A | 12/1989 | Glesmann |
| 5,586,130 A | 12/1996 | Doyle |
| 5,924,057 A * | 7/1999 | Kell ........................... 702/165 |
| 6,087,965 A | 7/2000 | Murphy |
| 2003/0055599 A1 * | 3/2003 | Ohle et al. ................. 702/158 |

* cited by examiner

Primary Examiner—Bryan Bui
Assistant Examiner—Tung S. Lau
(74) Attorney, Agent, or Firm—Ditthavong & Carlson, P.C.

(57) ABSTRACT

A system and method to prevent odometer fraud in a vehicle are described, including determining whether the vehicle is driven for a predetermined period of time, such as an hour, and checking whether input to the odometer is consistent with such determination. For example, if an insufficient number of vehicle speed pulses have been received during the period of time that the vehicle has been driven, then it can be concluded that the vehicle speed pulse input has been removed from the odometer and various fraud prevention actions can be taken, such as changing the odometer display to output "ERROR" or disabling the odometer from working, even after the vehicle speed pulse input is reconnected to the odometer.

14 Claims, 3 Drawing Sheets

METHOD TO PREVENT ODOMETER FRAUD

FIELD OF THE INVENTION

The present invention relates to automotive systems and more particularly to a method for preventing odometer fraud.

BACKGROUND OF THE INVENTION

Odometer fraud is a serious problem affecting the used vehicle sales industry, because used vehicle prices are determined by the age, mileage, and overall condition of the vehicle. Of these factors, the age and mileage have the greatest effect on the price of the used vehicle. There is little way to falsify the age of the vehicle, however, because the vehicle identification number (VIN) tag permanently attached to the vehicle indicates the model year of the vehicle. Accordingly, the most common way to fraudulently inflate the value of the vehicle is to modify the odometer reading, so that the odometer mileage appears lower than the actual mileage of the vehicle.

In some cases, odometers are made from a series of rotating dials. However, a person can modify the reading on such a mechanical odometer by "roll back", in which the number dials are rotated in reverse to show a lower mileage number. Various techniques have been developed to prevent these modifications. One way to counteract this type of odometer fraud is to employ a digital odometer, which is not subject to roll back.

A digital odometer is typically connected to a sensor system, typically located in the engine or tire, that measures a series of vehicle speed pulses generated, for example, from the rotation of the wheel. The sensor system translates the received pulses to a distance value that is displayed on the digital odometer, for example, in miles or kilometers. The pulses can also be used for determining and displaying the vehicle speed on a digital speedometer.

Even digital odometers are susceptible to tampering. Therefore, there is a need for preventing odometer fraud for digital odometers.

SUMMARY OF THE INVENTION

The present invention stems from the realization that one way of fraudulently modifying the mileage on a digital odometer is to disconnect the vehicle speed pulse input. If no pulses are received, the digital odometer will not change. Accordingly, preventing such fraud is addressed by determining whether a vehicle is driven for a predetermined period of time, such as an hour, and checking whether input to an odometer is consistent with such determination. For example, if no vehicle speed pulses have been received during the period of time that the vehicle has been driven, then it can be concluded that the vehicle speed pulse input has been removed from the odometer. When it is concluded that the vehicle speed pulse input has been removed, various fraud prevention actions can be taken, such as changing the odometer display to output "ERROR" or disabling the odometer from working, even after the vehicle speed pulse input is reconnected to the odometer.

Accordingly, one aspect of the present invention relates to a method, system, and software for preventing fraudulent tampering of an odometer disposed within a vehicle, in which it is determined whether the vehicle has been driven for a predetermined period of time. Pulses on an input to the odometer are counted during the predetermined period of time, and an odometer fraud condition is signaled based on the number of pulses and the determination of whether the vehicle has been driven for the predetermined period of time. In some embodiments, determining whether the vehicle has been driven is based on monitoring one or more of the following conditions: the gear shift position, the parking brake position, the seat buckling state, the use of turn signals and headlights, and how the alternator and tachometers are operating. The odometer fraud condition, which can be triggered if there are no pulses during the time in which the vehicle was driven, can be used to cause an error indication to be displayed on the odometer and to disable the speedometer.

Another aspect pertains to a method, system, and software for preventing tampering of a recording device disposed within a vehicle, including determining whether the vehicle has been driven for a predetermined period of time, counting a number of pulses on an input to the recording device during the predetermined period of time, and comparing the counted number of pulses with a predetermined threshold. If the vehicle has been driven for a predetermined period of time and if the counted number of pulses is less than or equal to the predetermined threshold, then a fraud condition is signaled.

Still another aspect involves a method, system, and software for preventing tampering of an odometer disposed within a vehicle, including determining whether the vehicle has been driven for at least an hour and counting a number of pulses on an input to the odometer during the hour. If the vehicle has been driven for the hour and if the counted number of pulses is zero, then an error indication is caused to be displayed on the odometer.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for preventing odometer fraud are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
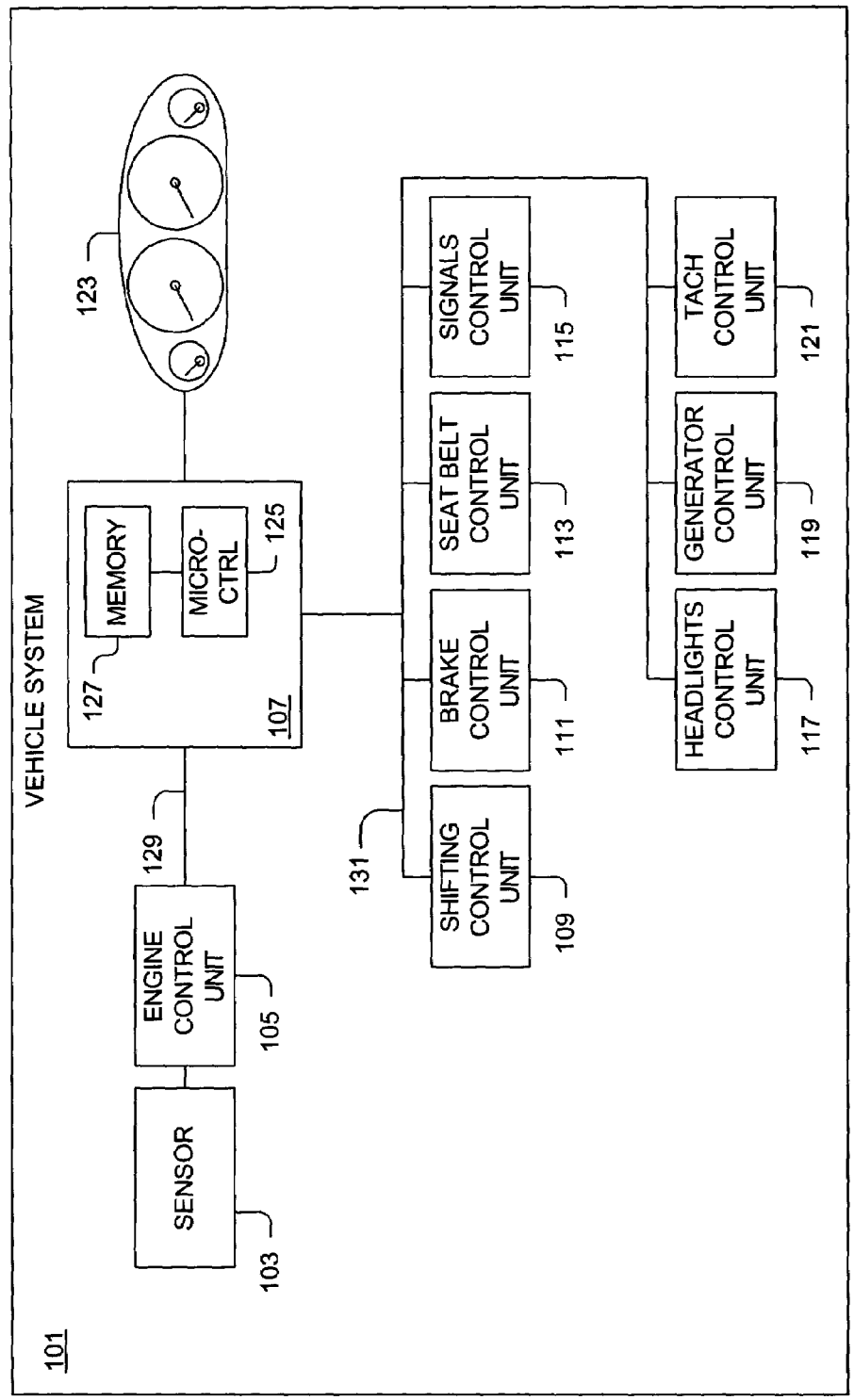
FIG. 1 depicts a vehicle system that can be used to implement an embodiment of the present invention.

Referring to FIG. 1, an odometer fraud prevention vehicle system 100 includes a vehicle system 101. The vehicle system 101 includes, for example, a wheel rotation sensor 103, an engine control unit (ECU) 105, an instrument cluster controller 107, vehicle sub-system control units, and an instrument cluster 123. The control units can include, for example, a shifting control unit 109, a brake control unit 111, a seat belt control unit 113, a signals control unit 115, a headlights control unit 117, a generator control unit 119, and a tachometer control unit 121 coupled to the instrument cluster controller 107, via signal line or cable 131.

The sensor 103 provides wheel rotation information to the engine control unit 105, which provides vehicle speed pulses based on the wheel rotation information to the instrument cluster controller 107 over input signal line or cable 129. The instrument cluster controller 107 includes a microcontroller 125 and memory 127 for calculating vehicle speed and mileage traveled for display on a digital speedometer and a digital odometer of the instrument cluster 123.

Accordingly, to prevent a correct vehicle mileage from being displayed on the digital odometer, the pulse input 129 to the instrument cluster controller 107 may be disconnected. With the pulse input 129 removed from the instrument cluster controller 107, although the instrument cluster 123 may still function and provide warnings and other information, via the control units 109–121, the odometer, speedometer, and maintenance required indicator functions can be disabled, allowing for odometer fraud. An embodiment of the present invention, however, allows the instrument cluster controller 107 to determine (e.g., via software implemented with the microcontroller 125 and the memory 127) if the vehicle has been driven for a predetermined period of time (e.g., one hour) with the vehicle speed pulse input 129 disconnected from the instrument cluster controller 107. If it is determined that the vehicle has been driven for the predetermined period of time with the vehicle speed pulse input 129 disconnected from the instrument cluster controller 107, then the odometer indicating display (e.g., a liquid crystal display (LCD), etc.) of the instrument cluster 123 can be set to display "ERROR," instead of the vehicle mileage. A similar message can be displayed in the speedometer of the instrument cluster 123.

In one embodiment, the odometer will not function correctly even after the vehicle speed pulse input 129 is reconnected to the instrument cluster controller 107, and the error condition cannot be reset or rectified. Advantageously, this permanently indicates to dealers or potential buyers of a vehicle employing the odometer fraud prevention vehicle system 100 that the vehicle speed pulse input 129 has been disconnected in order to prevent odometer mileage accumulation.

In an alternate embodiment, however, the error message can be corrected, if the speed pulse input 129 is reconnected within a designated period of time. This can be used for cases of a circuit failure that causes the loss of the speed pulse inputs through no fault of the driver. In this case, an error message alerting the driver for a need to reattach the pulse input signal line 129 or have the vehicle serviced for a fault, may be helpful in correcting for such errors. With this embodiment, a counter can be employed so that a reversible error message is generated a predetermined number of times (e.g., three times), and then becomes irreversible, as in the previous embodiment. Advantageously, this embodiment would allow a dealer to correct periodic electrical problems, while preventing a fraudulent vehicle user from continuously changing the odometer settings in an attempt to commit odometer fraud.

In FIG. 1, the instrument cluster 123 can include power inputs, such as battery and/or ignition inputs. The vehicle speed pulses, input via the signal line or cable 129, are used by the microcontroller 125 of the instrument cluster controller 107 to calculate speed and mileage traveled for display on the instrument cluster 123. The microcontroller 125 can be powered by the battery or ignition power input to the instrument cluster 123. In the case that the vehicle speed pulse input line 129 is disconnected from the instrument cluster controller 107, the microcontroller 125 still can detect various vehicle conditions, via the control units.

For example, with the speed pulse input line 129 is disconnected, the microcontroller 125 can detect: if a gear shift position has changed from Park to Drive, via the shifting control unit 109; if a parking brake is released, via brake control unit 111; if a seat belt has been buckled, via the seat belt control unit 113; if turn signals have been used, via the signals control unit 115; if headlights are turned on or off, via the headlights control unit 117; if an alternating current generator is running either in a high mode or a low mode (e.g., an indication that an engine of the vehicle is running), via the generator control unit 119; and if a tachometer input is varying (e.g., an indication that shifting is occurring), is staying relatively constant (e.g., an indication that cruising is occurring), for example, within +/−250 rpm range, via the tachometer control unit 121.

From a combination of one or more of the above-noted conditions, the instrument cluster controller 107 can determine if the vehicle is being driven. However, the car could be put on a lift and be driven with the pulse input line 129 disconnected for trouble shooting purposes at a dealership, which would trigger an odometer fraud error or warning condition. Accordingly, to avoid false warnings, a predetermined amount of time (e.g., one hour) of accumulated driving without vehicle speed pulse inputs is monitored by the instrument cluster controller 107, via a timer. After the predetermined amount of time expires with no vehicle speed pulses received, the instrument cluster controller 107 can conclude that the vehicle is being driven with the speed pulse input line 129 disconnected and take appropriate action, such as displaying of an "ERROR" condition on the digital odometer of the instrument cluster 123.

Figure 2:
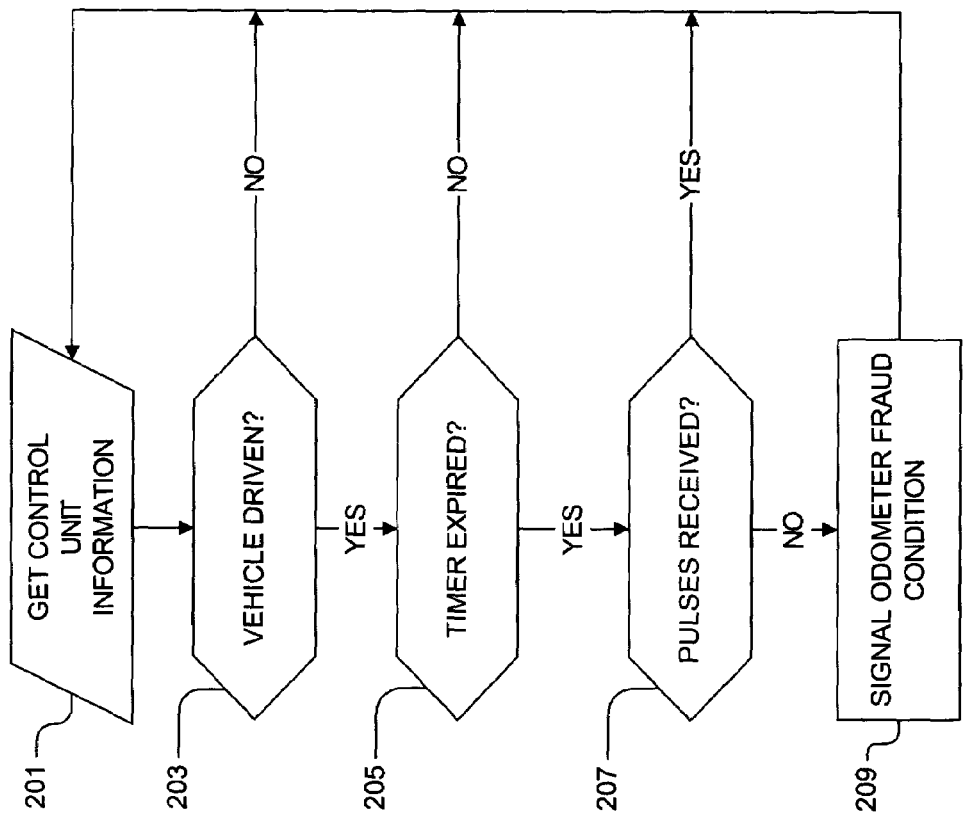
FIG. 2 is a flowchart for illustrating preventing of odometer fraud in the vehicle system of FIG. 1.

FIG. 2 is a flowchart for illustrating preventing of odometer fraud in the vehicle system of FIG. 1. Accordingly, in FIG. 2, at step 201, the instrument cluster controller 107 receives information from the control units (e.g., gear shift position has changed from Park to Drive, parking brake is released seat belt has been buckled in, turn signals have been used, headlights are turned on or off, alternating current generator is running either in high mode or low mode, tachometer input is varying, etc.). Based on such information, the instrument cluster controller 107 determines if the vehicle has been driven, at step 203.

If, at step 203, it is determined that the vehicle has not been driven, control returns to step 201. If, at step 203, however, it is determined that the vehicle has been driven, it is then determined, at step 205, if a timer (e.g., of 30 minutes, 45 minutes, or one hour duration) has expired. If, at step 205, it is determined that the timer has not expired, control returns to step 201. If, at step 205, however, it is determined that the timer has expired, it is then determined, at step 207, if the number of vehicle speed pulses is less than or equal to a predetermined threshold.

If, at step 207, it is determined that vehicle speed pulses exceed the threshold, then control returns to step 201. If, at step 207, however, it is determined that an insufficient number of vehicle speed pulses (e.g. zero or half the number of pulses that should have been received if the vehicle had been driven as the indicated by the control united) have been received, then the instrument cluster controller 107 signals an odometer fraud condition at step 209. In response to this condition, an error indication (e.g., "ERROR") may be displayed on the digital odometer of the instrument cluster 123, and control returns to step 201, completing the odometer fraud prevention process.

Figure 3:
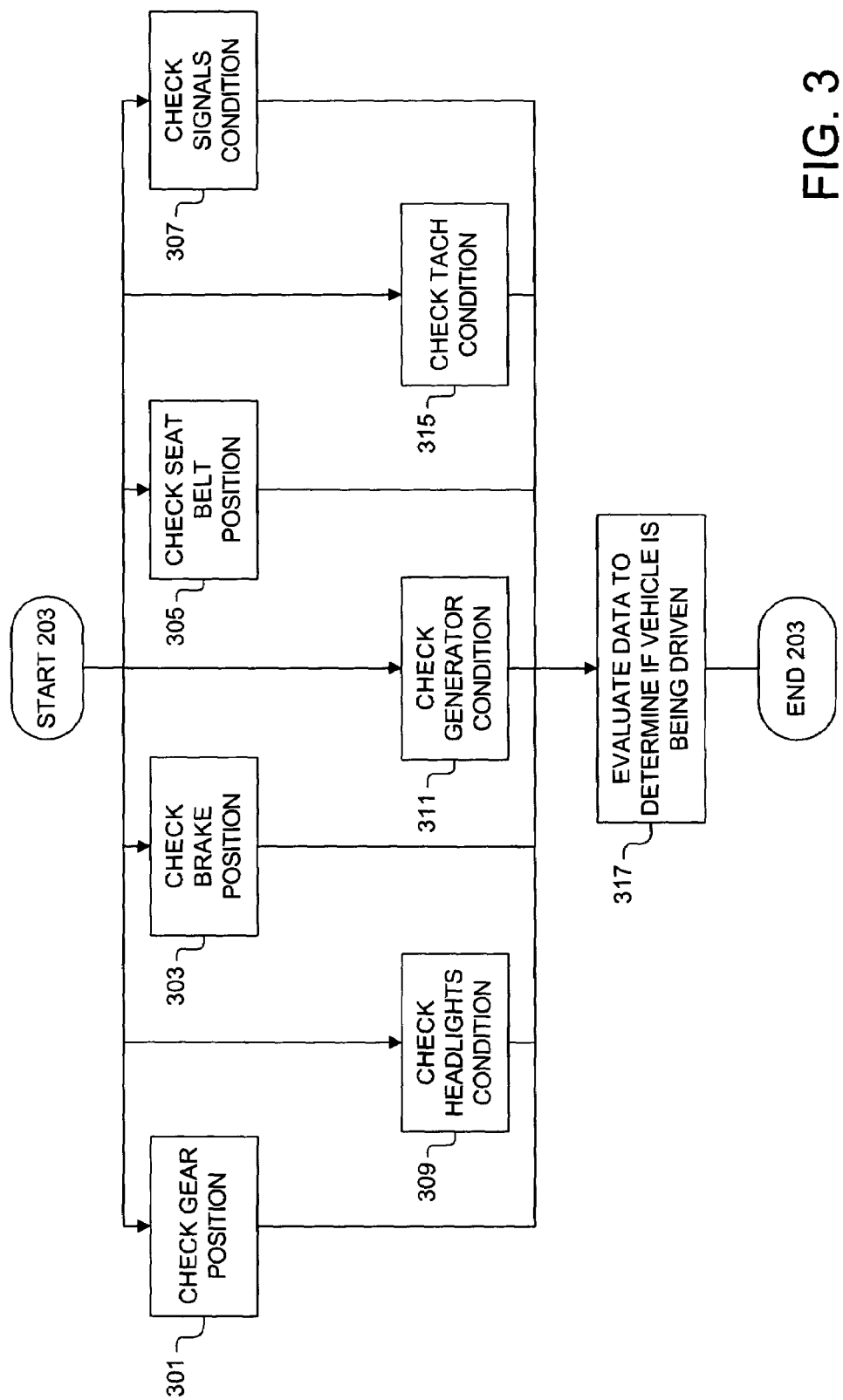
FIG. 3 is a flowchart for illustrating a step in the flowchart of FIG. 2 of determining if a vehicle is driven.

FIG. 3 is a flowchart illustrating details for the step 203, in the flowchart of FIG. 2, of determining if the vehicle has been driven. Accordingly, in FIG. 3, the instrument cluster controller 107, for example, checks: at step 301, if the gear shift position has changed from Park to Drive via the shifting control unit 109. At step 303, if the parking brake is released via brake control unit 111 is checked. Whether the seat belt has been buckled can be checked via the seat belt control unit 113 (step 305). At step 307, it can be determined whether turn signals have been used via the signals control unit 115, and, at step 309, whether headlights are turned on or off, via the headlights control unit 117. Another factor that can be considered via the generator control unit 119 is whether the alternating current generator (alternator) is running either in a high mode or a low mode, which indicates that the engine is running (step 311). If the tachometer input is varying, then shifting or accelerating is occurring. On the other hand, if the tachometer input is relatively constant (e.g., within +/−250 rpm range), then the vehicle is cruising. These conditions can be checked at step 315 via the tachometer control unit 121. The instrument cluster controller 107 then evaluates the vehicle data, gathered via the steps 301–315 to determine if the vehicle has been driven, at step 317, completing the process.

It is to be understood that the odometer fraud prevention vehicle system 100 of FIGS. 1–3 is illustrated for exemplary purposes, since many variations of the specific hardware and/or software used to implement the embodiments of the present invention are possible, as will be appreciated by those skilled in the relevant art. For example, the functionality of the devices and the subsystems of the system 100 can be implemented, via one or more programmed computer systems or devices.

To implement such variations as well as other variations, a single computer system can be programmed to perform the special purpose functions of one or more of the devices and subsystems of the odometer fraud prevention vehicle system 100. On the other hand, two or more programmed computer systems or devices can be substituted for any one of the devices and subsystems of the odometer fraud prevention vehicle system 100. Accordingly, principles and advantages of distributed processing, such as redundancy and replication, also can be implemented as desired to increase the robustness and performance of the odometer fraud prevention vehicle system 100, for example.

The odometer fraud prevention vehicle system 100 can store information relating to various processes described herein. This information can be stored in one or more memories (e.g., the memory 127 and/or memories included in the engine control unit 103 and/or control units 109–121), such as a hard disk, optical disk, magneto-optical disk, RAM, etc., of the devices of the odometer fraud prevention vehicle system 100. The one or more memories of the devices and subsystems of the odometer fraud prevention vehicle system 100 of FIGS. 1–3 also can store the information used to implement the embodiments of the present invention. The information can be organized using data structures (e.g., records, tables, arrays, fields, graphs, trees, and/or lists) included in the one or more memories, such as the memories listed above or any of the storage devices listed below.

These processes can use appropriate data structures for storing data collected and/or generated by the processes of the odometer fraud prevention vehicle system 100 of FIGS. 1–3 in one or more of their memories. Such data structures accordingly can include fields for storing such collected and/or generated data.

All or a portion of the odometer fraud prevention vehicle system 100 (e.g., as described with respect to FIGS. 1–3) can be conveniently implemented using one or more conventional general purpose computer systems, microprocessors, digital signal processors, micro-controllers (e.g., the micro-controller 125 and/or microcontrollers included in the engine control unit 103 and/or control units 109–121), programmed with appropriate software. In addition, the odometer fraud prevention vehicle system 100 can be implemented by the preparation of application-specific integrated circuits or by interconnecting an appropriate network of conventional component circuits, as will be appreciated by those skilled in the electrical arts.

The one or more memories (e.g., the memory 127 and/or memories included in the engine control unit 103 and/or control units 109–121) can include a main memory, such as a random access memory (RAM) or other dynamic storage device for storing information and instructions to be executed by the one or more processors (e.g., the microcontroller 125 and/or microcontrollers included in the engine control unit 103 and/or control units 109–121). The main memory can also be used for storing temporary variables or other intermediate information during execution of instructions by the one or more processors. The one or more memories can further include a read only memory (ROM) or other static storage device for storing static information and instructions for the one or more processors. A storage device, such as a magnetic disk or optical disk, can be coupled to a bus (e.g., signal lines or cables 129 and/or 131) for persistently storing information and instructions.

The display(s) of the instrument cluster 123 can include a display device, such as a cathode ray tube (CRT), liquid crystal display (LCD), active matrix display, plasma display, etc., for displaying information to a user of the vehicle system 101. An input device, such as buttons including alphanumeric and other keys, etc., for communicating information and command selections to the one or more processors can be included in the instrument cluster 123 and/or a user interface (not shown). Another type of user input device, such as a mouse, a trackball, cursor direction keys, etc., can be provided in the instrument cluster 123 or user interface for cursor control for communicating direction information and command selections to the one or more processors and for controlling cursor movement on the display of the instrument cluster 123 or user interface.

According to one embodiment of the invention, odometer fraud is prevented in response to the one or more processors executing an arrangement of instructions contained in the main memory. Such instructions can be read into the main memory from another computer-readable medium, such as a storage device. Execution of the arrangement of instructions contained in the main memory causes the one or more processors to perform the process steps described herein (e.g., with respect to FIGS. 1–3). The one or more processors, in a multi-processing arrangement, also can be employed to execute the instructions contained in the main memory. In alternative embodiments, hard-wired circuitry can be used in place of or in combination with software instructions to implement the embodiments of the present invention. Thus, the embodiments of the present invention are not limited to any specific combination of hardware circuitry and/or software.

Wireless links also can be implemented. In any such implementation, electrical, electromagnetic, optical, etc., signals that carry digital data streams representing various types of information can be employed. Further, the instrument cluster 123 or user interface can include peripheral interface devices, such as a Universal Serial Bus (USB) interface, a PCMCIA (Personal Computer Memory Card International Association) interface, etc. In addition, multiple communication interfaces also can be employed in the instrument cluster 123 or user interface.

The term "computer-readable medium" as used herein refers to any medium that participates in providing instructions to the one or more processors for execution. Such a medium can take many forms, including but not limited to non-volatile media, volatile media, and transmission media. Non-volatile media include, for example, optical or magnetic disks, such as a storage device. Volatile media include dynamic memory, such as the main memory. Transmission media can include coaxial cables, copper wire and fiber optics, including the wires that comprise a bus (e.g., the signal lines or cables 129 and/or 131). Transmission media can also take the form of acoustic, optical, or electromagnetic waves, such as those generated during radio frequency (RF) and infrared (IR) data communications.

Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

While the present invention has been described in connection with a number of embodiments and implementations, the present invention is not so limited but covers various obvious modifications and equivalent arrangements, which fall within the purview of the appended claims.

What is claimed is:

1. A method for preventing fraudulent tampering of an odometer disposed within a vehicle, comprising:
   determining whether the vehicle has been driven for a predetermined period of time;
   counting a number of pulses on an input to the odometer during the predetermined period of time; and
   signaling an odometer fraud condition based on the number of pulses and said determining whether the vehicle has been driven for the predetermined period of time, wherein the odometer fraud condition is signaled when the number of pulses is zero.

2. A method for preventing fraudulent tampering of an odometer disposed within a vehicle, comprising:
   determining whether the vehicle has been driven for a predetermined period of time;
   counting a number of pulses on an input to the odometer during the predetermined period of time; and
   signaling an odometer fraud condition based on the number of pulses and said determining whether the vehicle has been driven for the predetermined period of time, wherein the predetermined period of time is at least an hour.

3. A method for preventing fraudulent tampering of an odometer disposed within a vehicle, comprising:
   determining whether the vehicle has been driven for a predetermined period of time;
   counting a number of pulses on an input to the odometer during the predetermined period of time;
   signaling an odometer fraud condition based on the number of pulses and said determining whether the vehicle has been driven for the predetermined period of time; and
   in response to signaling an odometer fraud condition, causing an error indication to be displayed on the odometer.

4. A method as according to claim 3, further comprising:
   in response to signaling an odometer fraud condition, disabling operation of a speedometer when the pulses are received on the input to the odometer.

5. A computer-readable medium bearing instructions arranged to cause one or more processors to perform the method according to claim 3.

6. An instrumentation display system comprising a memory and a controller and configured to perform the method according to claim 3.

7. A method for preventing tampering of a recording device disposed within a vehicle, comprising:
   determining whether the vehicle has been driven for a predetermined period of time, wherein the predetermined period of time is at least an hour;
   counting a number of pulses on an input to the recording device during the predetermined period of time;
   comparing the counted number of pulses with a predetermined threshold; and
   if the vehicle has been driven for the predetermined period of time and if the counted number of pulses is less than or equal to the predetermined threshold, then signaling a fraud condition.

8. A method as according to claim 7, wherein the predetermined threshold is zero.

9. A method as according to claim 7, wherein the recording device includes a digital odometer.

10. A computer-readable medium bearing instructions arranged to cause one or more processors to perform the method of claim 7.

11. An instrumentation display system comprising a memory and a controller and configured to perform the method according to claim 7.

12. A method for preventing tampering of an odometer disposed within a vehicle, comprising:
    determining whether the vehicle has been driven for at least an hour;
    counting a number of pulses on an input to the odometer during the hour; and
    if the vehicle has been driven for the hour and if the counted number of pulses is zero, then causing an error indication to be displayed on the odometer.

13. A computer-readable medium bearing instructions arranged to cause one or more processors to perform the method of claim 12.

14. An instrumentation display system comprising a memory and a controller and configured to perform the method according to claim 12.

* * * * *